(12) United States Patent
Brand et al.

(10) Patent No.: US 7,314,539 B2
(45) Date of Patent: Jan. 1, 2008

(54) PRESSURE ELECTROLYZER AND METHOD FOR OPERATING ONE SUCH ELECTROLYZER

(75) Inventors: Rolf August Brand, Bruckmuehl (DE); Pietro d'Erasmo, Notodden (NO); Hans Hofmann, Muehlheim (DE); Marko Raemisch, Ottobrunn (DE)

(73) Assignee: Gesellschaft fuer Hochleistungselektrolyseure zur Wasserstofferzeugung mbH, Ottobrunn (DE)

( * ) Notice: Subject to any disclaimer, the term of this patent is extended or adjusted under 35 U.S.C. 154(b) by 591 days.

(21) Appl. No.: 10/492,550

(22) PCT Filed: Oct. 12, 2002

(86) PCT No.: PCT/EP02/11436

§ 371 (c)(1),
(2), (4) Date: Nov. 1, 2004

(87) PCT Pub. No.: WO03/033768

PCT Pub. Date: Apr. 24, 2003

(65) Prior Publication Data

US 2005/0077174 A1     Apr. 14, 2005

(30) Foreign Application Priority Data

Oct. 15, 2001    (DE)    ................. 101 50 557

(51) Int. Cl.
   C25B 9/08    (2006.01)

(52) U.S. Cl. .................. 204/258; 204/257; 204/266

(58) Field of Classification Search ............... 204/258, 204/257, 266
See application file for complete search history.

(56) References Cited

U.S. PATENT DOCUMENTS 3,652,431 A * 3/1972 Reynolds ..................... 205/338

(Continued)

FOREIGN PATENT DOCUMENTS

DE    2548699    6/1989

(Continued)

*Primary Examiner*—Bruce F. Bell
(74) *Attorney, Agent, or Firm*—Crowell & Moring LLP (57) ABSTRACT

The invention discloses a pressure electrolyzer comprising a pressure vessel (2) and an electrolytic-cell block (3) arranged in the pressure vessel (2) and containing a plurality of electrolytic cells (4) combined in the form of a stack. The electrolytic cells (4) in each case contain anodes (11) and cathodes (12), and an electrolyte-circuit system is provided for supplying an anolyte to the anodes (11) and for supplying a catholyte to the cathodes (12), and wherein the electrolytic-cell block (3) comprises a housing (5) which is sealed relative to the interior of the pressure vessel (2). The invention provides that the housing (5) of the electrolytic-cell block (3), together with the pressure vessel (2), forms at least two chambers (7, 8) separated from each other, which constitute a part of the electrolyte-circuit system and which are defined relative to the electrolytic cells (4) by the housing (5) and relative to the atmosphere by the pressure vessel (2). In preferred embodiments, one of the chambers (7) which is separated from another chamber constitutes a part of an anolyte circuit, and another of the chambers (8) which is separated from said one chamber constitutes a part of a catholyte circuit.

42 Claims, 6 Drawing Sheets

U.S. PATENT DOCUMENTS

| | | | |
|---|---|---|---|
| 4,077,863 A | 3/1978 | Nasser | 204/268 |
| 4,323,442 A | 4/1982 | Lantin et al. | |
| 5,690,797 A * | 11/1997 | Harada et al. | 204/228.5 |
| 5,783,051 A * | 7/1998 | Hirai et al. | 204/254 |
| 6,554,978 B1 * | 4/2003 | Vandenborre | 204/258 |
| 7,048,839 B2 * | 5/2006 | Harada | 204/266 |
| 2003/0141200 A1 * | 7/2003 | Harada | 205/637 |
| 2005/0178061 A1 * | 8/2005 | Tonca | 48/61 |
| 2006/0049039 A1 * | 3/2006 | Brand et al. | 204/237 |
| 2006/0131167 A1 * | 6/2006 | Ramisch et al. | 204/253 |

FOREIGN PATENT DOCUMENTS

| | | |
|---|---|---|
| DE | 4029634 A1 | 3/1992 |
| DE | 29607767 U1 | 11/1996 |
| DE | 19781442 C1 | 11/2000 |
| EP | 0023168 | 9/1984 |
| EP | 0806498 A1 | 11/1997 |

* cited by examiner

Detail Z

PRESSURE ELECTROLYZER AND METHOD FOR OPERATING ONE SUCH ELECTROLYZER

BACKGROUND AND SUMMARY OF THE INVENTION

The present invention relates to a pressure electrolyzer, and to a method of operating said pressure electrolyzer.

Pressure electrolyzers are known for the eletrolytic splitting-up of water into hydrogen and oxygen. Such known pressure electrolyzers comprise a pressure vessel and an electrolytic-cell block, which is arranged in said pressure vessel and contains a plurality of electrolytic cells which are combined in the form of a stack. The electrolytic cells in each case contain anodes and cathodes, and an electrolyte-circuit system is provided for supplying an anolyte to the anodes and for supplying a catholyte to the cathodes. The electrolytic-cell block comprises a housing which is sealed relative to the interior of the pressure vessel.

A pressure electrolyzer of this description is known from German Publication DE 25 48 699 C3. In the case of this known pressure electolyzer, means for the purification, cooling and circulation of the electrolyte are also arranged in the pressure vessel in addition to the electrolytic-cell block.

An object of the invention is to provide an improved pressure electrolyzer. Furthermore, an improved method of operating such a pressure electrolyzer is to be described.

As far as the apparatus is concerned, this object is met by the claimed pressure electrolyzer.

Advantageous further developments of the pressure electolyzer according to the invention are set out in the dependent claims.

As far as the method is concerned, the set object is met by the claimed method. Advantageous further developments of the method according to the invention are set out in the dependent claims.

The invention provides a pressure electrolyzer which comprises a pressure vessel and an electrolytic-cell block which is arranged in the pressure vessel and contains a plurality of electrolytic cells combined in the form of a stack. The electrolytic cells in each case contain anodes and cathodes, and an electrolyte-circuit system is provided for supplying an anolyte to the anodes and for supplying a catholyte to the cathodes. The electrolytic-cell block comprises a housing which is sealed relative to the interior of the pressure vessel. It is provided, according to the invention, that the housing of the electrolytic-cell block, together with the pressure vessel, forms at least two chambers, which are separated from each other, which constitute a part of the electrolyte-circuit system and which are defined relative to the electrolytic cells by the housing and relative to the atmosphere by the pressure vessel. An advantage of the pressure electrolyzer according to the invention is the simplicity of the design of the electrolyte-circuit system. A further advantage is that relatively little space is required by the pressure electrolyzer according to the invention.

According to a particularly preferred embodiment of the pressure electrolyzer according to the invention, one of the chambers, being separated from the other chamber, constitutes a part of an anolyte circuit, and the other chamber, being separated from said one chamber, constitutes a part of a catholyte circuit. An advantage of this embodiment is that, by separating the anolyte and catholyte circuits, it is possible to achieve a higher degree of gas purity and, consequently, a wider range of load control.

A particularly preferred embodiment of the pressure electrolyzer according to the invention provides that the chambers which are separated from each other are separated by separating walls which extend between the housing and the pressure vessel.

According to a preferred embodiment, the pressure vessel has the shape of a cylinder and the longitudinal axis of the electrolytic-cell block is arranged in the pressure vessel parallel with the axis of the cylinder.

According to a further preferred embodiment of the pressure electrolyzer according to the invention, the separating walls extend between the housing and the pressure vessel parallel with the axis of the cylinder.

According to a particularly preferred embodiment of the pressure electrolyzer according to the invention, the housing of the electrolytic-cell block is composed of a plurality of cell frames of the electrolytic cells, which cell frames are stacked side by side.

According to an advantageous further development in this regard, it is provided that, in each case, each anode has its own anode cell frame and, in each case, each cathode has its own cathode cell frame, and that the anode cell frames comprise passages, which produce a connection between the anode and the chamber which constitutes a part of the anolyte circuit, and that the cathode cell frames comprise passages which produce a connection between the cathode and the chamber which constitutes a part of the catholyte circuit.

A further advantageous embodiment provides that the electrolytic-cell block is arranged with its longitudinal direction substantially horizontally, and that that chamber, which is defined by the housing of the electrolytic-cell block and the pressure vessel, is vertically subdivided in the longitudinal direction of the electrolytic-cell block into the two chambers which are separated from each other.

A particularly advantageous further development of the two last-mentioned embodiments provides that the passages producing a connection with the anodes are in communication, in each case on the upper side and on the lower side of the anode cell frames, with the one of the chambers, which is separated from the other chamber and constitutes a part of the anolyte circuit, and that the passages producing a connection with the cathodes are in communication, in each case on the upper side and on the lower side of the cathode cell frames with the other of the chambers, which is separated from said one chamber and constitutes a part of the catholyte circuit. The advantage hereof is that it is possible for the electrolyte to circulate automatically without an additional electrolyte-circuit pump, due to a gas lift effect because of the gases rising in the cells and the lower density of the electrolyte/gas mixture in the cells, relative to the degassed electrolyte columns outside the cells. The product gases oxygen, respectively hydrogen, collect along the crowns of the two chambers which are separated from each other.

According to a further advantageous embodiment of the pressure electrolyzer according to the invention, essential components of the electrolyte-circuit system, in particular a gas separator and/or an electrolyte cooler, are provided within the pressure vessel. The advantage hereof is a particularly space-saving, compact design of the pressure electrolyzer.

According to a further advantageous embodiment, one of the separating walls is arranged below the electrolytic-cell block and simultaneously forms a mechanical support for said block.

A particularly advantageous embodiment of the pressure electrolyzer according to the invention provides that the anodes and cathodes are encircled by a sealing element, which extends about their periphery and which forms a lateral end of the electrolytic cell in the region of the anode, respectively of the cathode, and which is sealingly fitted between the cell frames.

A particularly preferred embodiment hereof provides that the anode and the cathode of an electrolytic cell are each separately encircled in a sealing element.

The sealing elements of the anode and the cathode are preferably jointly sealingly fitted between two successive cell frames.

The sealing elements preferably also form a lateral end of the electrolytic cell on a diaphragm which is arranged between the anode and the cathode.

The diaphragm is preferably sealingly fitted between the sealing element of the anode and the sealing element of the cathode.

The sealing elements are preferably arranged about the periphery of the anode and/or of the cathode so as to extend in the manner of a frame.

According to a preferred embodiment, it is provided that the sealing elements are designed to be led about the edge of the anode and/or of the cathode from the front side to the rear side of said anode and/or said cathode.

According to a particularly advantageous embodiment hereof, the sealing elements are provided with one or more sealing lips, which extend about the periphery of the anode, respectively of the cathode, and which rest sealingly against a sealing face of the anode cell frame, respectively of the cathode cell frame.

It is preferably provided, in this regard, that the sealing lips project in a perpendicular direction relative to the flat side of the anode, respectively of the cathode, and that the sealing faces of the anode cell frame, respectively of the cathode cell frame, are designed to extend parallel to the flat side of the anode, respectively of the cathode.

The sealing elements are preferably produced from an elastomer.

In this regard, it is particularly advantageous when the sealing elements are produced by extrusion-coating of the edge of the anode, respectively of the cathode, using the elastomer.

According to an advantageous further development of the pressure electrolyzer according to the invention, two adjacent electrolytic cells are separated from each other by a bipolar metal sheet which is encircled by a sealing element, which extends about the periphery of said bipolar metal sheet and forms a lateral end of the electrolytic cell in the region of the bipolar metal sheet and is sealingly fitted between the cell frames of the adjacent electrolytic cells.

The sealing element is preferably arranged to extend about the periphery of the bipolar metal sheet in the manner of a frame.

According to an embodiment, the sealing element is arranged on one side of the bipolar metal sheet.

According to another embodiment, the sealing element is designed to be led about the edge of the bipolar metal sheet, from the front side to the rear side thereof.

According to a preferred embodiment, the sealing element is provided with one or more sealing lips which extend about the periphery of the bipolar metal sheet and rest sealingly against a sealing face of the anode cell frame, respectively of the cathode cell frame, or against the bipolar metal sheet itself.

A preferred embodiment hereof provides that the sealing lips project in a perpendicular direction relative to the flat side of the bipolar metal sheet, and that the sealing face of the anode cell frame, respectively of the cathode cell frame, is designed to extend parallel to the flat side of the bipolar metal sheet.

The sealing element is preferably produced from an elastomer.

It is possible for the sealing element to be produced by extrusion-coating of the edge of the bipolar metal sheet using the elastomer.

The separate chambers in the pressure vessels are, according to an advantageous development, connected to each other at a geodetically low point so as to permit an alignment of the levels between the anolyte and the catholyte. The connection is provided by a connecting pipe which extends outside the pressure vessel. By way of alternative, it is possible for the chambers within the pressure vessel to communicate via an opening or a membrane in the separating means.

For the purpose of the electrical insulation, the pressure vessel is, according to an embodiment, of an electrically non-conductive material. By way of alternative, each of the chambers defined by the housing of the electrolytic-cell block and the inner side of the pressure vessel are encapsulated by a shell of an electrically insulating material. It is also possible for the housing of the electrolytic-cell block and/or the pressure vessel to be provided with an electrically insulating coating or lining.

The separation of the gas takes place within the pressure vessel in regions disposed geodetically above the electrolytic-cell block. It is advantageous, in this regard, to arrange gas-coalescing aids, in the form of knit fabrics and/or ultrasonic transmitters and/or flow-deflecting means in the gas-separating regions.

According to a further development of the pressure electrolyzer according to the invention, a water-supply tank is provided. The water-supply tank is connected to a feed-water source via a feed-water filling pipe comprising a feed-water fill-up valve, to a bottom region of one of the separated chambers via a feed-water inflow pipe comprising a feed-water inflow valve, and to a top region of the one of the separated chambers via a pressurizing pipe comprising a pressurizing valve. The water-supply tank, additionally, can be evacuated relative to the atmosphere via a ventilation pipe comprising a ventilation valve, the top region of the one of the separated chambers being filled, during operation of the pressure electrolyzer, with one of the product gases.

According to an advantageous embodiment, it is provided that the one of the separated chambers, to which the water-supply tank is connected via the feed-water inflow pipe and via the pressurizing pipe, is the other separated chamber constituting a part of the electrolyte circuit.

As far as the method is concerned, the set object is met by a method of filling a pressure electrolyzer according to the two last-mentioned embodiments, including the following method steps:

a) pressure-free filling of the water-supply tank via the feed-water filling pipe with the feed-water fill-up valve open, while the ventilation valve is open, the pressurizing valve is closed and the feed-water inflow valve is closed, b) closing the ventilation valve and the feed-water fill-up valve, c) opening the pressurizing valve, so as to bring the water-supply tank to the pressure prevailing in the pressure vessel via the pressurizing pipe, d) opening the feed-water inflow valve, so as to admit metered quantities of feed water from the supply tank into the pressure vessel, and e) closing the feed-water inflow valve.

The metered addition of the feed water from the supply tank into the pressure vessel preferably takes place under gravity, the water-supply tank being arranged spatially above the pressure vessel.

By way of alternative, it is also possible for the metered addition of the feed water from the water-supply tank into the pressure vessel to be carried out by means of a feed-water pump included in the feed-water inflow pipe, which pump may then advantageously have a low capacity.

BRIEF DESCRIPTION OF THE DRAWINGS

Preferred exemplified embodiments of the invention will be explained hereinafter, with reference to the drawings, in which:

FIGS. 5a) to c) are detailed illustrations on different scales to demonstrate the manner in which the electrolytic cells are sealed at the housing of the electrolytic-cell block.

DETAILED DESCRIPTION OF THE INVENTION

Figure 1:
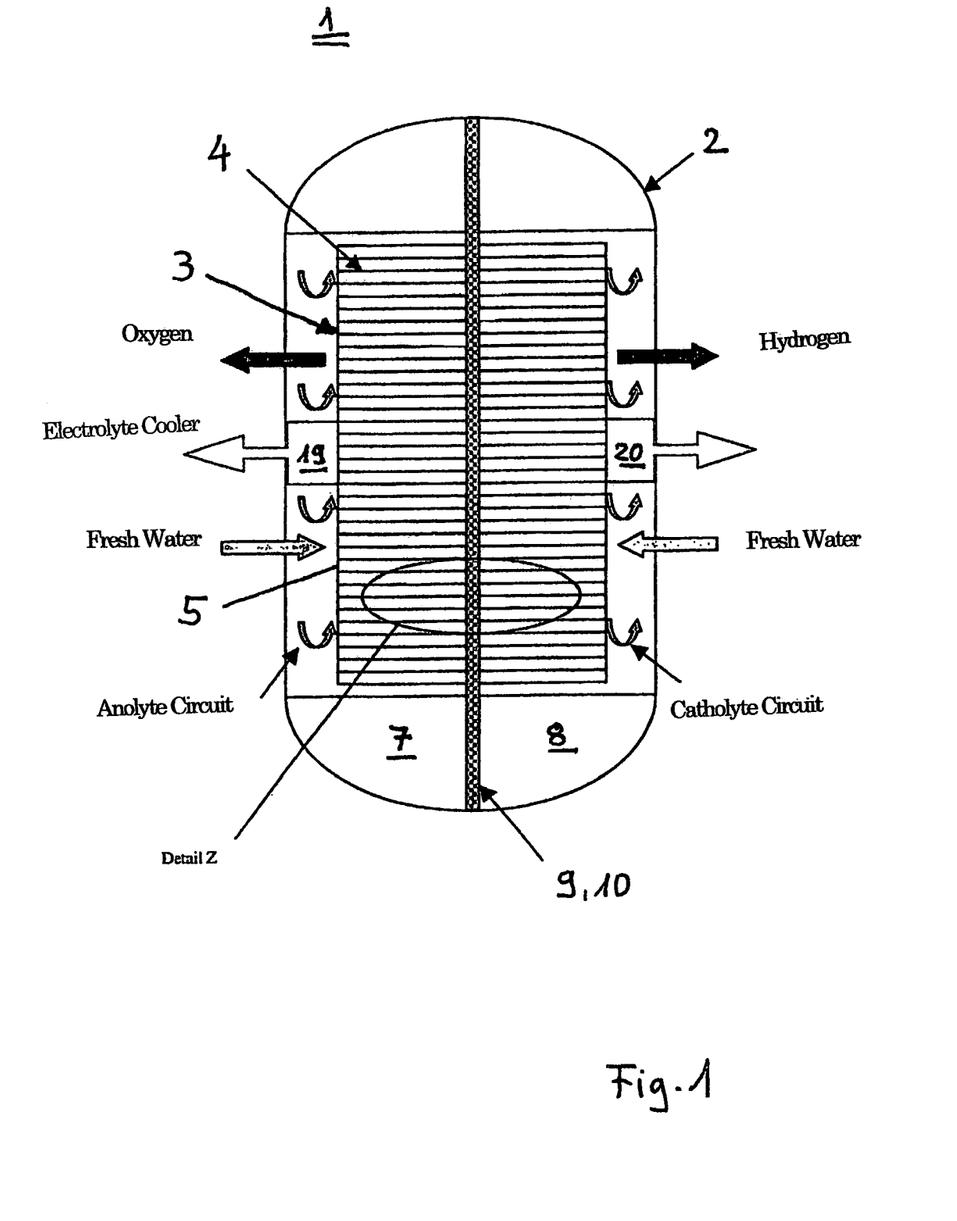
FIG. 1 shows a diagrammatic cut top view of a pressure electrolyzer according to an exemplified embodiment of the invention.

In FIG. 1, a pressure electrolyzer, which is designated as a whole by the reference number 1, comprises a pressure vessel 2, in which is arranged an electrolytic-cell block 3 which is composed of a plurality of electrolytic cells 4 combined in the form of a stack.

Figure 3:
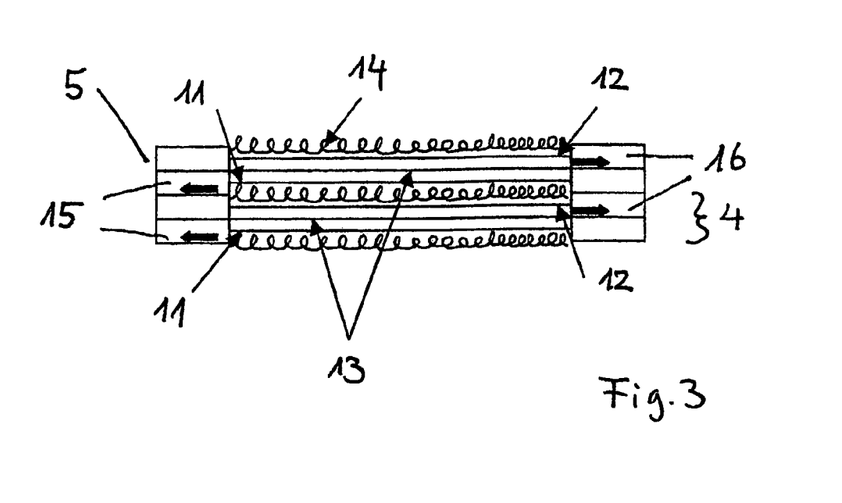
FIG. 3 shows a cut plan view of a part of the electrolytic-cell block, to demonstrate the most important components of the electrolytic cells.

As is shown more clearly in FIG. 3, in which two electrolytic cells 4 and their essential components are illustrated, an electrolytic cell 4 comprises an anode 11 and a cathode 12, which are separated from each other by a diaphragm 13 which is arranged therebetween. A bipolar metal sheet 14 is disposed between two adjacent electrolytic cells 4, by means of which bipolar metal sheet the cell cavity on the anode side of the one electrolytic cell 4 is separated from the cell space on the cathode side of the adjacent electrolytic cell 4, while simultaneously being maintained in electrical contact with each other. For information regarding the further design of the elctrolytic-cell block 3, reference is made, for example, to German publication DE 197 81 442 C1. This shows, in particular, the manner in which it is possible to feed current into the cell block, what voltage is applied to the end plates and to the pressure vessel, and the manner in which the electrical insulation is ensured.

Referring again to FIG. 1, it will be seen that two chambers 7, 8 are formed between a merely roughly indicated housing 5 of the electrolytic-cell block 3 and the pressure vessel 2, which chambers are separated from each other by separating walls 9, 10 which extend between the housing 5 and the pressure vessel 2. The two chambers 7, 8 which are separated from each other constitute a part of the electrolytic-circuit system of the pressure electrolyzer, with one of the chambers 7, which is separated from the other chamber, constituting a part of an anolyte circuit and the other of the chambers 8, which is separated from said one chamber, constituting a part of a catholyte circuit. As is diagrammatically shown by respective arrows in FIG. 1, the reaction products of the electrolytic process taking place in the pressure electrolyzer, being oxygen from the anolyte circuit in the separated chamber 7 and hydrogen from the catholyte circuit in the separated chamber 8, are collected and drawn off and are, in each case, replaced by a corresponding quantity of fresh water.

As is further shown diagrammatically in FIG. 1, additional essential components of the electrolytic-circuit system, for instance electrolyte coolers 19, 20, are arranged in the separated chambers 7, 8. The pressure vessel 2 has the shape of a cylinder in which the electrolytic-cell block 3 is arranged with its longitudinal axis parallel with the cylinder axis. The separating walls 9, 10 extend between the housing 5 of the electrolytic-cell block 3 and the pressure vessel 2 parallel with the axis of the cylinder.

Figure 4:
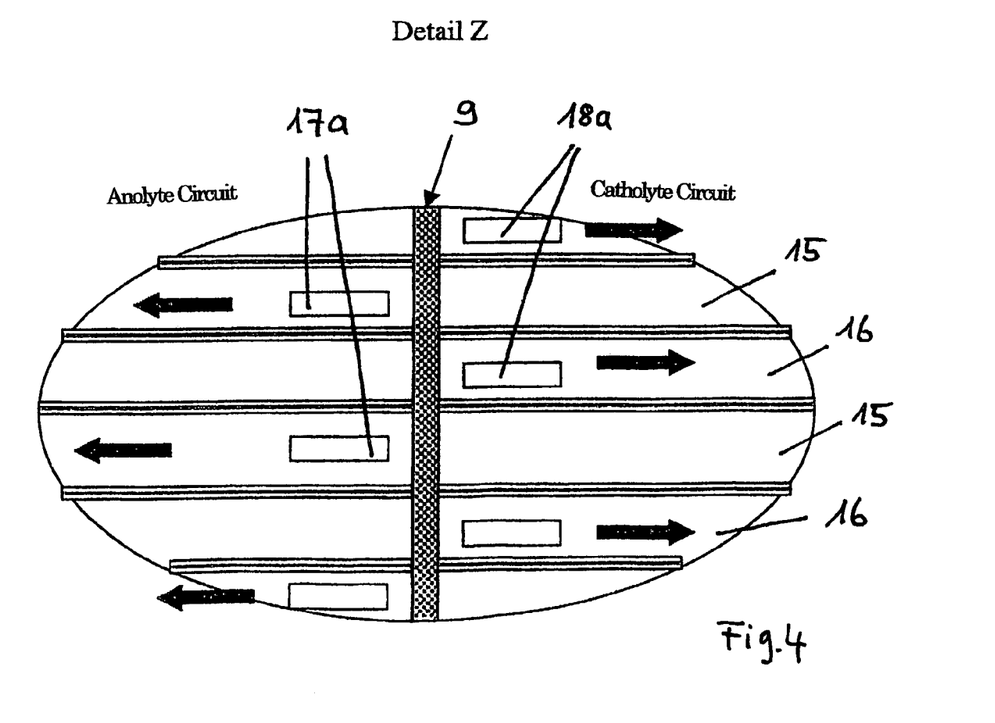
FIG. 4 shows an enlarged view of the detail marked with the reference Z in FIG. 1, to explain the manner in which the flow is led in the anolyte circuit and in the catholyte circuit.

As will be seen in FIG. 4 showing the enlarged Detail Z of FIG. 1, together with FIG. 3, the housing 5 of the electrolytic-cell block 3 is composed of a plurality of cell frames 15, 16 of the electrolytic cells 4, which cell frames are stacked one on top of the other. In this regard, its own anode-cell frame 15 is provided, in each case, adjacent to each anode 11, and its own cathode-cell frame 16 is provided, in each case, to each cathode 12.

Figure 2A:
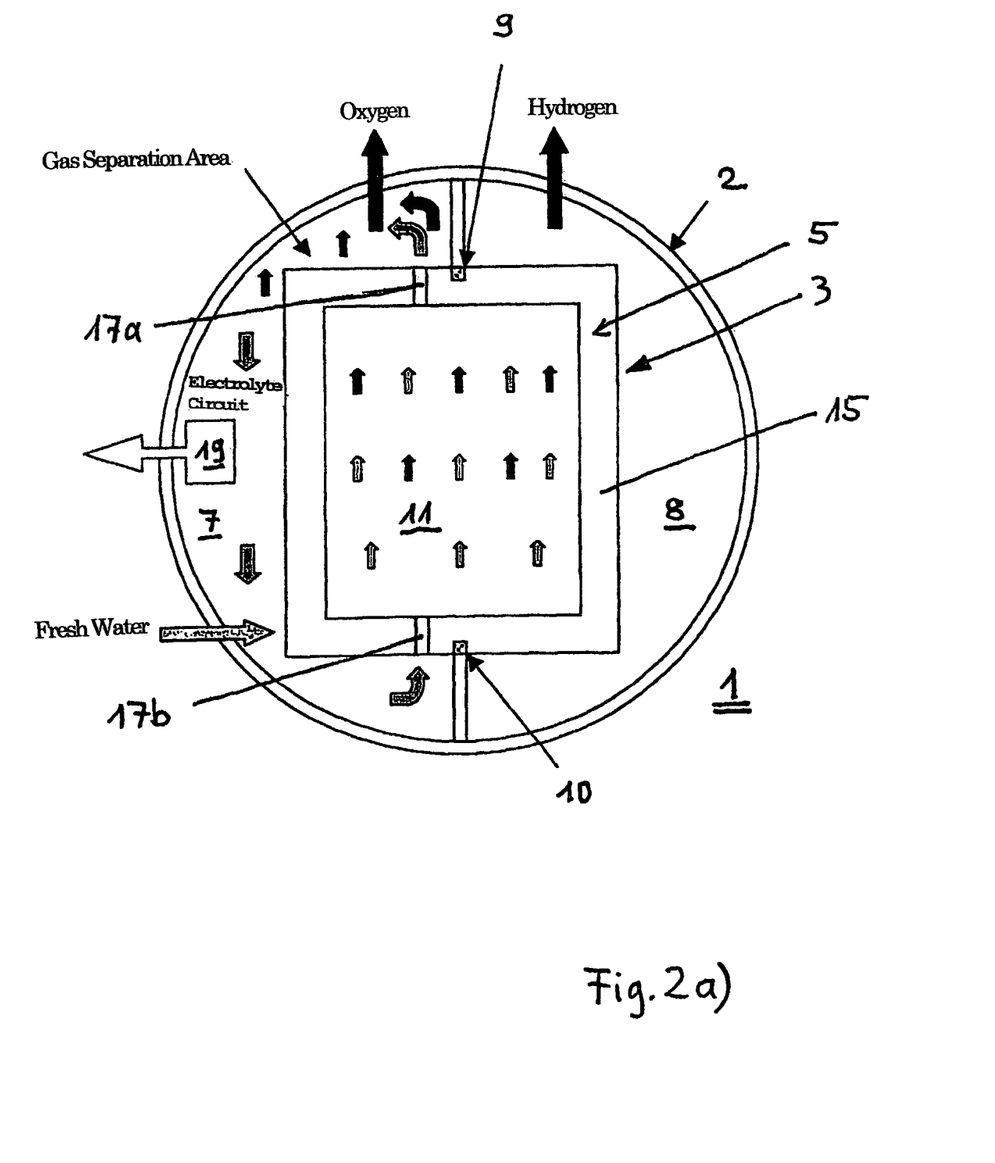
FIG. 2a) shows a cut side view of the pressure electrolyzer shown in FIG. 1, to illustrate the anolyte circuit.
Figure 2B:
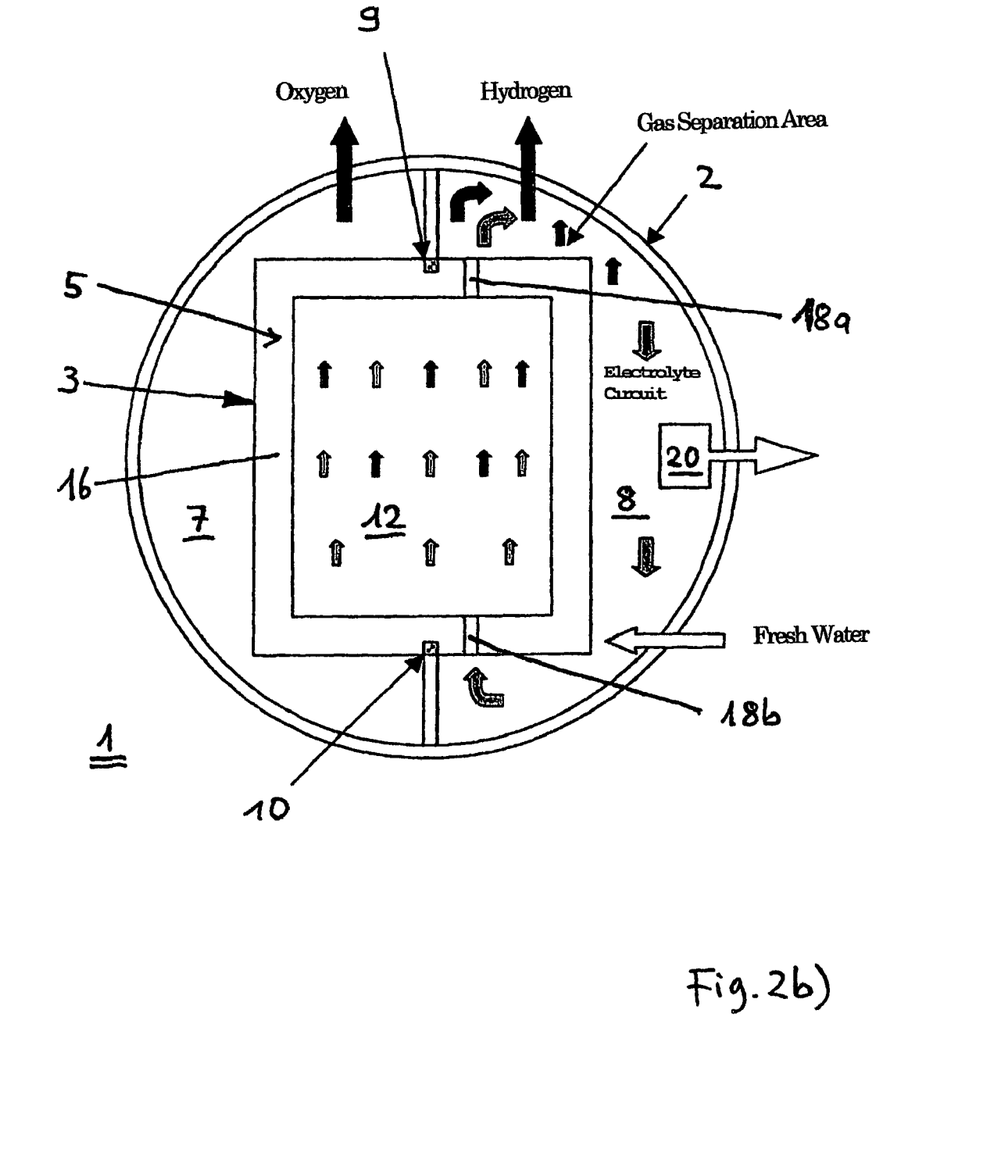
FIG. 2b) shows a sectional view corresponding to FIG. 2a) to illustrate the catholyte circuit.

As is shown in FIGS. 2a) and b), in which the pressure electrolyzer 1 of FIG. 1 is, in each case, illustrated in a vertical sectional view, passages 17a, b are provided in the anode cell frames 15 to produce a connection between the anode side and the chamber 7 constituting a part of the anolyte circuit, cf. FIG. 2a), and the cathode cell frames 16 comprise passages 18a, b which produce a connection between the cathode side and the chamber 8 constituting a part of the catholyte circuit.

As will also be seen in FIGS. 2a) and b), the space defined by the housing 5 of the electrolytic-cell block 3, the longitudinal direction of which is arranged horizontally, and by the pressure vessel 2, is subdivided vertically and in the longitudinal direction of the electrolytic-cell block 3 into the two chambers 7, 8 which are separated from each other. The passages 17a, b, which produce a connection between the anode 11 and the anolyte circuit, are in communication, in each case, on the upper side, respectively the bottom side of the anode cell frames 15 with the one of the chambers 7, which is separated from the other chamber and constitutes a part of the anolyte circuit, and the passages 18a, b, which produce a connection between the cathode side and the catholyte circuit, are in communication, in each case, on the upper side, respectively the bottom side of the cathode cell frames 16 with the other of the chambers 8, which is separated from said one chamber and constitutes a part of the catholyte circuit. The space in the pressure vessel 2 above the electrolytic-cell block 3, which is divided axially by the separating wall 9, serves chamber 7 on the left-hand side of the separating wall 9, for the separation of oxygen, and chamber 8 on the right-hand side of the separating wall 9, for the separation of hydrogen. It is possible to arrange gas-coalescing aids in the form of hydrophobic knit fabrics, ultrasonic transmitters, flow-deflecting means and baffle plates in the gas-separating region above the electrolytic-cell block 3. The electrolyte circuit on the two sides, i.e. in the anolyte circuit through the chamber 7 and in the catholyte circuit through the chamber 8, in each case takes place automatically as a result of a gas lift effect, due to the gases rising in the electrolytic cells 4 and due to the lower density of the electrolyte/gas mixture in the cells relative to the degassed electrolyte columns outside in the separated chambers 7, 8. If required, it is possible to provide an electrolyte-circulating pump, but this is not illustrated. One of the separating walls 10 is arranged below the electrolytic-cell block 3 and simultaneously constitutes a mechanical support for said block. The pressure vessel 2 thus serves as a supporting structure for the electrolytic-cell block 3.

Figure 5:
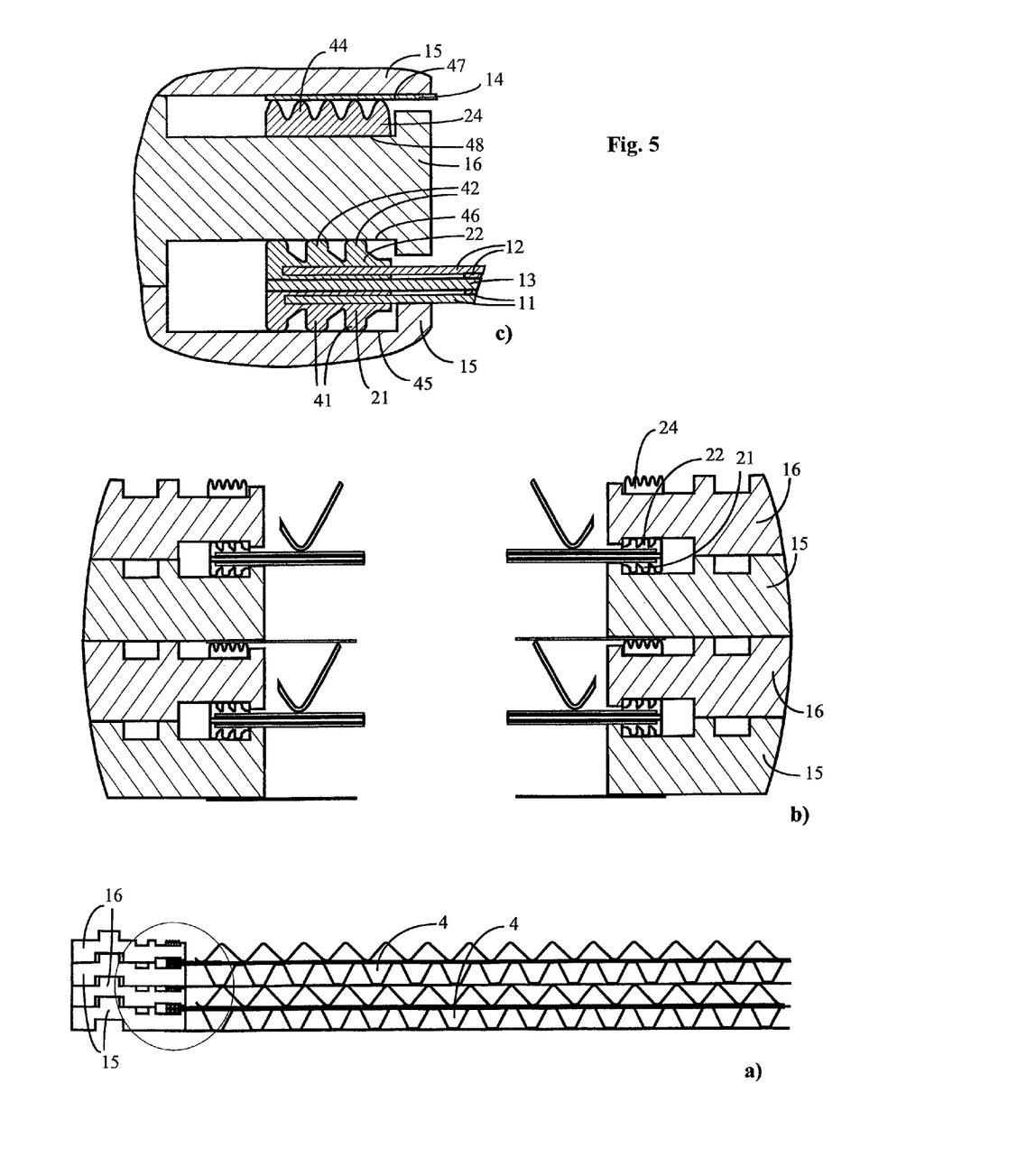

As is shown by the FIGS. 5a) to c) in illustrations on different scales, the anodes 11, which are, in each case, electrically connected to an anode electrode, and the cathodes 12, which are, in each case, electrically connected to a cathode electrode, are surrounded, in each case, by a sealing element 21, 22, which extends about their periphery and forms a lateral end of the electrolytic cell 4 in the region of the anode 11, respectively of the cathode 12. The sealing elements 21, 22 are sealingly fitted between the cell frames 15, 16 of an electrolytic cell 4, i.e. between the anode cell frame 15 and the cathode cell frame 16.

Available in each case to the anode 11 and the cathode 12 of an electrolytic cell 4 is its own separate sealing element 21, respectively 22, and said sealing elements 21, 22 are jointly sealingly fitted between said cell frames 15, 16 of a cell 4, the diaphragm 13, which separates the anode 11 and the cathode 12 of an electrolytic cell 4 from each other, being sealingly fitted between the sealing elements 21, 22. As a result hereof, the sealing elements 21, 22 also form a lateral end of the electrolytic cell 4 on the diaphragm 13. The sealing elements 21, 22 are provided to extend in the form of frames about the periphery of the anode 11, respectively of the cathode 12.

As the enlarged illustration in FIG. 5c) shows, the sealing elements 21, 22 are designed to be led about the edge of the anode 11, respectively the cathode 12, from the front side to the rear side thereof.

As is shown in FIGS. 5b) and c), the sealing elements 21, 22 are provided with a plurality of sealing lips 41, 42, which extend along, respectively parallel to the periphery of the anode 11, respectively of the cathode 12, and which project in a direction perpendicular to the flat side of the anode 11, respectively of the cathode 12, and which sealingly rest against a sealing face 45 of the anode cell frame 15, respectively a sealing face 46 of the cathode cell frame 16, with said sealing faces 45, 46 being designed to extend parallel to the flat side of the anode 11, respectively of the cathode 12.

The sealing elements 21, 22 are produced from an elastomer and are formed by extrusion-coating of the edge of the anode 11, respectively of the cathode 12.

As FIGS. 5a) to c) further show, the bipolar metal sheet 14, which separates two adjacent electrolytic cells 4 from each other, is also sealingly fitted between the cell frames 15, 16 of two adjacent electrolytic cells 4, i.e. between the anode cell frame 15 of the one electrolytic cell 4 and the cathode cell frame 16 of the adjacent electrolytic cell 4.

The bipolar metal sheet 14 is encircled by a sealing element 24 which extends in the manner of a frame about its periphery and which constitutes, in the region of the bipolar metal sheet 14, a lateral end of the electrolytic cell 4 and is sealingly fitted between the cell frames 15, 16 of the adjacent electrolytic cells 4.

As is shown in the enlarged illustration of FIG. 5c), the sealing element 24 is arranged on one side of the bipolar metal sheet 14 and is provided with a plurality of sealing lips 44, which extend along, respectively parallel to the periphery of the bipolar metal sheet 14 and which rest sealingly against the bipolar metal sheet 14 itself. The sealing lips 44 project in a direction perpendicular to the flat side of the bipolar metal sheet 14. The cell frames 15, 16, between which the bipolar metal sheet 14, together with its sealing element 24, is fitted each have sealing faces 47, 48 which are designed to extend parallel to the flat side of the bipolar sheet 14 and against which the sealing element 24, respectively the bipolar metal sheet 14, rest sealingly. The sealing element 24 is produced from an elastomer.

Figure 6:
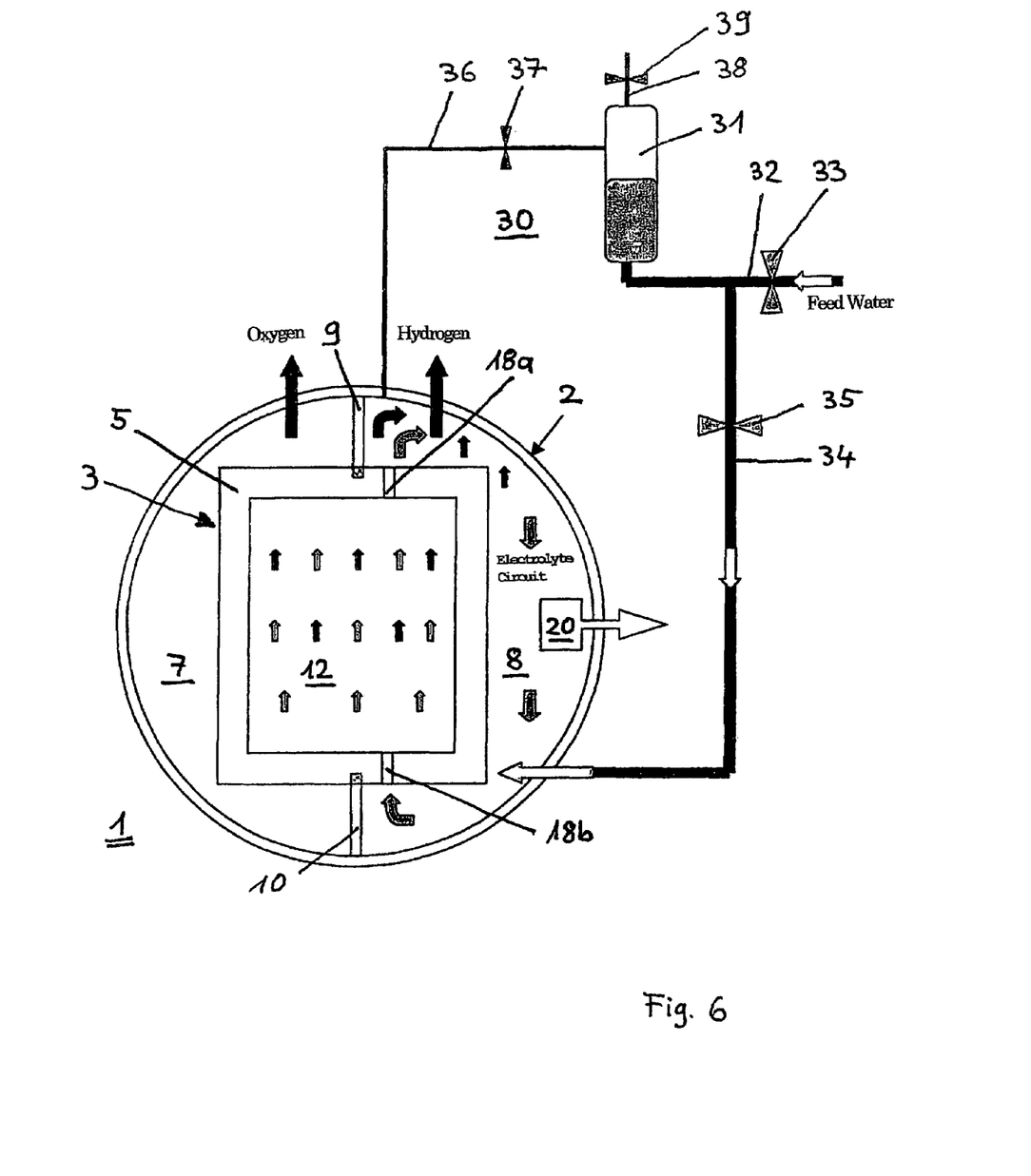
FIG. 6 is a diagrammatic block illustration which includes additional components for the filling of the pressure electrolyzer with feed water.

Referring now to FIG. 6, an advantageous arrangement 30 for filling the pressure electrolyzer 1 with feed water and a corresponding method will be described. A water-supply tank 31 is provided and said tank is connected to a feed-water source via a feed-water filling pipe 32 comprising a feed-water fill-up valve 33, and to a lower region of the separated chamber 8 via a feed-water inflow pipe 34 comprising a feed-water inflow valve 35, and is further connected to an top region of the separated chamber 8 via a pressurizing pipe 36 comprising a pressurizing valve 37. In addition, it is possible for the water-supply tank 31 to be evacuated relative to the atmosphere via a ventilation pipe 38 comprising a ventilation valve 39. The top region of the separated chamber 8, which is in communication with the pressurizing pipe 36, is filled during operation of the pressure electrolyzer 1 with pressurized hydrogen as the product gas. The method for filling the pressure electrolyzer 1 includes the following method steps:

a) A first step involves a pressure-free filling of the water-supply tank 31 via the feed-water filling pipe 32 with the opened feed-water fill-up valve 33, while the ventilation valve 39 is open and the pressurizing valve 37 is closed and the feed-water inflow valve 35 is closed.

b) The ventilation valve 39 and the feed-water fill-up valve 33 are then closed.

c) Then the pressurizing valve 37 is opened, so as to bring the water-supply tank 31 via the pressurizing pipe 36 to the pressure prevailing in the pressure vessel 2.

d) Finally, the feed-water inflow valve 35 is opened, so as to admit metered quantities of feed water from the water-supply tank 31 into the pressure vessel 2.

e) The filling operation is then concluded with the closing of the feed-water inflow valve 35.

It is possible for the metered addition of the feed water from the water-supply tank 31 into the pressure vessel 2 to take place under the effects of gravity, with the water-supply tank 31 being arranged spatially above the pressure vessel 2. By way of alternative, it is also possible for the metered addition of the feed water from the water-supply tank 31 into the pressure vessel 2 to be carried out by means of a feed-water pump included in the feed-water inflow pipe 34.

During operations, different electrolyte concentrations set in on the anolyte side and on the catholyte side, as a result of which there is an osmotic pressure buildup with a rising electrolyte level on the cathode side. The difference in the concentrations is caused by a surplus of hydroxyl ions on the cathode side, as a result of which water flows from the anode side to the cathode side. Although an equalization of the concentrations between the catholyte and the anolyte is, in principle, possible via the cell diaphragms, a complete equalization is, as a rule, not possible due to the limited porosity of the cell diaphragms. It is therefore possible to provide for the equalization of the concentrations to be brought about by an additional charge of feed water to the catholyte. It is possible for the equalization to be carried out through a bore or a membrane in the separating wall 9, 10 at the foot of the electrolytic-cell block, or through a connecting pipe disposed on the outer side of the pressure vessel 2 and connecting the anolyte and catholyte chambers. For adjusting the flow, it is possible to provide an adjustable valve in the connecting pipe. The connecting pipe is preferably provided at a geodetically low point, so as to prevent gas-charged feed water from being exchanged.

In the event of an inadequate insulation of the current-carrying parts of the electrolyzer, it is possible that undesirable shunt currents occur, which must be prevented. For the electrical insulation, it is possible for the interior of the pressure vessel 2 to be provided with a non-conductive lining, e.g. a coating, or it is possible for the pressure vessel 2 itself to be manufactured from a non-conductive material. It is also possible for the anode cell frames and the cathode cell frames to be electrically insulated relative to the interior of the pressure vessel 2. In this regard, it is possible for the insulation to be composed of a material which, simultaneously, protects the cell frames against the corrosive action of the electrolyte. Furthermore, it is possible for the insulation to be composed of insulating shells, which constitute the chambers for the anolyte and the catholyte and, accordingly, encapsulate the chambers defined by the outer side of the electrolytic-cell block and the inner side of the pressure vessel 2.

The invention claimed is:

1. A pressure electrolyzer comprising:
   a pressure vessel, and
   an electrolytic-cell block which is arranged in the pressure vessel and contains a plurality of electrolytic cells combined in the form of a stack,
   wherein each of the electrolytic cells contains anodes and cathodes,
   wherein an electrolyte-circuit system is provided for supplying an anolyte to the anodes and for supplying a catholyte to the cathodes,
   wherein the electrolytic-cell block comprises a housing which is sealed relative to the interior of the pressure vessel,
   wherein the housing of the electrolytic-cell block, together with the pressure vessel, forms at least two chambers, which are separated from each other, which constitute a part of the electrolyte-circuit system, and which are defined relative to the electrolytic cells by the housing and relative to the atmosphere by the pressure vessel, and
   wherein one of the chambers, separated from another of the chambers, constitutes a part of an anolyte circuit, and the other of the chambers, separated from said one of the chambers, constitutes a part of a catholyte circuit.

2. A pressure electrolyzer according to claim 1, wherein the chambers, which are separated from each other, are separated from each other by separating walls which extend between the housing and the pressure vessel.

3. A pressure electrolyzer according to claim 2, wherein the pressure vessel has the shape of a cylinder, and wherein the electrolytic-cell block is arranged with its longitudinal axis parallel with the axis of the cylinder.

4. A pressure electrolyzer according to claim 3, wherein the separating walls extend parallel with the axis of the cylinder between the housing and the pressure vessel.

5. A pressure electrolyzer according to claim 2, wherein the housing of the electrolytic-cell block is composed of a plurality of cell frames of the electrolytic cells, which cell frames are stacked one on top of the other.

6. A pressure electrolyzer according to claim 5, wherein each anode has its own anode cell frame, wherein each cathode has its own cathode cell frame, wherein the anode cell frames comprise passages, which produce a connection between the anode and the chamber which constitutes a part of the anolyte circuit, and wherein the cathode cell frames comprise passages, which produce a connection between the cathode and the chamber which constitutes a part of the catholyte circuit.

7. A pressure electrolyzer according to claim 6, wherein the electrolytic-cell block is arranged with its longitudinal direction substantially horizontally, and wherein the chamber which is defined by the housing of the electrolytic-cell block and the pressure vessel is vertically subdivided in the longitudinal direction of the electrolytic-cell block into the at least two chambers which are separated from each other.

8. A pressure electrolyzer according to claim 7, wherein the passages producing a connection with the anodes are in communication, in each case, on the upper side and on the lower side of the anode cell frames with the chamber, which is separated from the other chamber and constitutes a part of the anolyte circuit, and wherein the passages producing a connection with the cathodes are in communication, in each case, on the upper side and on the lower side of the cathode cell frames with the other of the chambers, which is separated from said one chamber and constitutes a part of the catholyte circuit.

9. A pressure electrolyzer according to claim 7, wherein one of the separating walls is arranged below the electrolytic-cell block and simultaneously forms a mechanical support for said block.

10. A pressure electrolyzer according to claim 9, wherein each of the anodes and the cathodes is encircled by a sealing element, which extends about its periphery and forms a lateral end of the electrolytic cell in the region of the anode or the cathode, and which is sealingly fitted between the cell frames.

11. A pressure electrolyzer according to claim 10, wherein the anode and the cathode of an electrolytic cell are each separately encircled by a sealing element.

12. A pressure electrolyzer according to claim 11, wherein respective sealing elements of the anode and the cathode, are jointly sealingly fitted between two successive cell frames.

13. A pressure electrolyzer according to claim 12, wherein the sealing elements also form a lateral end of the electrolytic cell on a diaphragm which is arranged between the anode and the cathode.

14. A pressure electrolyzer according to claim 13, wherein the diaphragm is sealingly fitted between the sealing element of the anode and the sealing element of the cathode.

15. A pressure electrolyzer according to claim 10, wherein the sealing elements are arranged about the periphery of at least one of the anode and the cathode so as to extend in the manner of a frame.

16. A pressure electrolyzer according to claim 10, wherein the sealing elements are designed to be led about the edge of at least one of the anode and the cathode from a front side to a rear side of said at least one of the anode and the cathode.

17. A pressure electrolyzer according to claim 16, wherein the sealing elements are provided with one or more sealing lips extending respectively about the periphery of the anode and the cathode and resting sealingly against respective sealing faces of the anode cell frame and the cathode cell frame.

18. A pressure electrolyzer according to claim 17, wherein the sealing lips project in a perpendicular direction relative to respective flat sides of the anode and the cathode, and wherein the sealing faces of the anode cell frame and the cathode cell frame are designed to extend parallel to the flat sides of the anode and the cathode.

19. A pressure electrolyzer according to claim 17, wherein the sealing elements are produced from an elastomer.

20. A pressure electrolyzer according to claim 19, wherein the sealing elements are produced by extrusion-coating edges of the anode and the cathode using the elastomer.

21. A pressure electrolyzer according to claim 5, wherein two adjacent electrolytic cells are separated from each other by a bipolar metal sheet which is encircled by a sealing element which extends about the periphery of said bipolar metal sheet and which, in the region of the bipolar metal sheet, forms a lateral end of the electrolytic cell and is sealingly fitted between the cell frames of adjacent electrolytic cells.

22. A pressure electrolyzer according to claim 21, wherein the sealing element is arranged to extend about the periphery of the bipolar metal sheet in the manner of a frame.

23. A pressure electrolyzer according to claim 22, wherein the sealing element is produced from an elastomer.

24. A pressure electrolyzer according to claim 23, wherein the sealing element is produced by extrusion-coating of the edge of the bipolar metal sheet, using the elastomer.

25. A pressure electrolyzer according to claim 21, wherein the sealing element is arranged on one side of the bipolar metal sheet.

26. A pressure electrolyzer according to claim 21, wherein the sealing element is designed to be led about the edge of the bipolar metal sheet from the front side to the rear side thereof.

27. A pressure electrolyzer according to claim 21, wherein the sealing element is provided with one or more sealing lips which extend about the periphery of the bipolar metal sheet and rest sealingly against a sealing face of the anode cell frame, respectively of the cathode cell frame, or against the bipolar metal sheet itself.

28. A pressure electrolyzer according to claim 27, wherein the sealing lips project in a perpendicular direction relative to the flat side of the bipolar metal sheet, and wherein the sealing face of the anode cell frame, respectively of the cathode cell frame, is designed to extend parallel to the flat side of the bipolar metal sheet.

29. A pressure electrolyzer according to claim 1, wherein at least one of a gas separator and an electrolyte cooler is provided within the pressure vessel.

30. A pressure electrolyzer according to claim 29, wherein separation of gas into the chambers takes place substantially in regions which are disposed geodetically above the electrolytic-cell block.

31. A pressure electrolyzer according to claim 30, wherein gas-coalescing aids, in the form of at least one of knit fabrics, ultrasonic transmitters, and flow-deflecting means, are arranged in the regions of gas separation.

32. A pressure electrolyzer according to claim 1, wherein the chambers in the pressure vessel are connected to each other at a geodetically low point, so as to permit an alignment of the levels between the anolyte and the catholyte.

33. A pressure electrolyzer according to claim 32, wherein the chambers are connected by a connecting pipe which extends outside the pressure vessel.

34. A pressure electrolyzer according to claim 32, wherein the chambers are linked to each other at a geodetically low point within the pressure vessel via an opening or a membrane in the separating means.

35. A pressure electrolyzer according to claim 1, wherein the pressure vessel is of an electrically nonconductive material.

36. A pressure electrolyzer according to claim 1, wherein each of the chambers defined by the housing of the electrolytic-cell block and the inner side of the pressure vessel is encapsulated by a shell of an electrically insulating material.

37. A pressure electrolyzer according to claim 1, wherein an electrically insulating coating or lining is provided to at least one of the housing of the electrolytic-cell block on its side facing the chambers and the pressure vessel on its inner side.

38. A pressure electrolyzer according to claim 1, wherein a water-supply tank is connected to a feed-water source via a feed-water filling pipe comprising a feed-water fill-up valve, to a bottom region of one of the separated chambers via a feed-water inflow pipe comprising a feed-water inflow valve, and to a top region of the one of the separated chambers via a pressurizing pipe comprising a pressurizing valve, and wherein the water-supply tank can be evacuated relative to the atmosphere via a ventilation pipe comprising a ventilation valve, the top region of the one of the separated chambers being filled, during operation of the pressure electrolyzer, with one of the product gases.

39. A pressure electrolyzer according to claim 38, wherein the one of the separated chambers, to which the water-supply tank is connected via the feed-water inflow pipe and via the pressurizing pipe, is the other separated chamber constituting a part of the catholyte circuit.

40. A method of filling a pressure electrolyzer according to claim 39, comprising:
  a) filling the water-supply tank via the feed-water filling pipe with the opened feed-water fill-up valve while the ventilation valve is open, the pressurizing valve is closed, and the feed-water inflow-valve is closed,
  b) closing the ventilation valve and the feed-water fill-up valve,
  c) opening the pressurizing valve so as to bring the water-supply tank, via the pressurizing pipe, to the pressure prevailing in the pressure vessel,
  d) opening the feed-water inflow valve, so as to admit metered quantities of feed water from the water-supply tank into the pressure vessel, and
  e) closing the feed-water inflow valve.

41. The method according to claim 40, wherein metered addition of the feed water from the water-supply tank into the pressure vessel takes place under gravity, the water-supply tank being arranged spatially above the pressure vessel.

42. The method according to claim 40, wherein metered addition of the feed water from the water-supply tank into the pressure vessel is carried out by way of a feed-water pump included in the feed-water inflow pipe.

* * * * *